(12) United States Patent
Abe et al.

(10) Patent No.: US 8,247,472 B2
(45) Date of Patent: Aug. 21, 2012

(54) FRICTION MATERIAL AND PRODUCTION METHOD OF FRICTION MATERIAL

(75) Inventors: Kenji Abe, Toyoto (JP); Masaaki Nishiwaki, Mishima (JP); Hiroshi Isono, Mishima (JP); Hiroyuki Fujikawa, Nagoya (JP); Satoshi Wakamatsu, Nagoya (JP); Yoshio Shimura, Aichi-gun (JP); Yuji Nagasawa, Seto (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/194,578

(22) Filed: Jul. 29, 2011

(65) Prior Publication Data

US 2011/0281962 A1    Nov. 17, 2011

Related U.S. Application Data

(62) Division of application No. 12/575,849, filed on Oct. 8, 2009.

(30) Foreign Application Priority Data

Oct. 10, 2008    (JP) .................................. 2008-264005

(51) Int. Cl.
*C08J 5/14*    (2006.01)

(52) U.S. Cl. ...................................................... 523/149

(58) Field of Classification Search .................. 523/149
See application file for complete search history.

(56) References Cited

U.S. PATENT DOCUMENTS

| | | | |
|---|---|---|---|
| 4,278,584 A | 7/1981 | Noguchi et al. |
| 5,127,949 A | 7/1992 | Nakazawa et al. |
| 5,258,441 A | 11/1993 | Nagahiro et al. |
| 5,753,018 A | 5/1998 | Lamport et al. |
| 6,013,146 A | 1/2000 | Yuan et al. |
| 6,162,315 A | 12/2000 | Lamport |
| 6,451,872 B1 | 9/2002 | Yamane |
| 2005/0064778 A1 | 3/2005 | Lam et al. |
| 2005/0284596 A1 | 12/2005 | Conley et al. |
| 2006/0019080 A1 | 1/2006 | Lam et al. |
| 2007/0052126 A1 | 3/2007 | Chiba et al. |

FOREIGN PATENT DOCUMENTS

| | | |
|---|---|---|
| GB | 2 264 714 A | 9/1993 |
| JP | 61-78839 | 4/1986 |
| JP | 5-62916 | 9/1993 |
| JP | 8-4811 | 1/1996 |
| JP | 11-152461 | 6/1999 |
| JP | 2008-37951 | 2/2008 |

OTHER PUBLICATIONS

Office Action mailed Oct. 17, 2011, in co-pending U.S. Appl. No. 12/575,849.
Notification of Reason(s) for Refusal issued Oct. 26, 2012 in Japanese Patent Application No. 2008-264005 (partial English translation).

*Primary Examiner* — Doris Lee
(74) *Attorney, Agent, or Firm* — Oblon, Spivak, McClelland, Maier & Neustadt, L.L.P.

(57) ABSTRACT

A friction material including: an amorphous resin that has a chain-like polymer structure; and other components that constitute the friction material and that are components other than the amorphous resin, wherein dispersion treatment is preliminarily carried out in which the amorphous resin is dispersed in at least one of the other components, and a manufacturing method of the friction material.

18 Claims, 2 Drawing Sheets

FRICTION MATERIAL AND PRODUCTION METHOD OF FRICTION MATERIAL

INCORPORATION BY REFERENCE

The disclosure of Japanese Patent Application No, 2008-264005 filed on Oct. 10, 2008 including the specification, drawings and abstract is incorporated herein by reference in its entirety.

BACKGROUND OF THE INVENTION

1. Field of the Invention

The invention relates to a friction material, which inhibits noise and vibrations during friction, and which improves moldability and reduces costs, and a production method of such a friction material.

2. Description of the Related Art

The brake pads, brake linings, clutch facings and other friction materials used in industrial machinery, railroad cars, cargo vehicles, automobiles and the like are required to have high reliability and increasingly high performance in order to ensure safety. More specifically, since friction materials are responsible for converting kinetic energy to heat through friction, they are required to have heat resistance against frictional heat generated during braking. At the same time, from the viewpoint of running stability, they are also required to demonstrate frictional properties that remain constant regardless of temperature or weather conditions, have superior wear resistance with little changes in properties over long period of time, and not generate noise such as squealing during braking or vehicle vibrations. In particular, noise and vibrations attributable to frictional vibration of the friction material are considered to be an important technical issue from the viewpoint of product value and quietness of vehicles.

In order to satisfy these requirements, friction materials are formed by combining several types of components. For example, fiber base materials for retaining the shape of the friction material, binders that bind components such as fiber base materials, and fillers for adjusting various properties of friction materials (such as adjustment and stabilization of wear resistance, heat resistance or friction coefficient) are used in combination. Friction materials are produced by curing a raw material mixture, which is obtained by mixing these components with a mixer, by hot-pressing followed by molding, grinding as necessary and sizing. Thermosetting resins as exemplified by phenol resins are frequently used as binders that compose friction materials due to their superior properties such as heat resistance, mechanical properties, low price and molding processability. Phenol resins are also subjected to modification, for the purpose of improving the properties and performance mentioned above. However, adequate effects have yet to be obtained for heat resistance and frictional properties. Conventional phenol resins are decomposed by heat during friction or be melted by that heat, thereby having a detrimental effect on noise properties and vibration properties of friction materials. Although improvement of vibration absorption of friction materials and inhibition of the occurrence of squealing and other abnormal noise have been carried out by using modified phenol resin capable of lowering the hardness of friction materials, this conversely resulted in the problems of lowering the heat resistance of friction materials and reducing moldability during friction material production.

Therefore, a polyimide resin having superior heat resistance has been proposed for use as a binder (for example, Japanese Patent Publication No. 5-62916). This Japanese Patent Publication No. 5-62916 describes a polyimide-based friction material obtained by thermocompression molding a polyimide composition obtained by adding 5 to 30 parts by weight of a fluororesin powder and 1 to 30 parts by weight of a transition metal powder having unpaired electrons in the d orbital and/or an oxide powder of that transition metal to 100 parts by weight of an aromatic polyimide resin powder. In this Japanese Patent Publication No. 5-62916, after dry-mixing each raw material at the blending ratios indicated above with a Henschel mixer, the mixture is compression molded under conditions of 320 to 370° C. and 800 to 1500 kg/cm$^2$ to produce a polyimide-based friction material. In the examples of this Japanese Patent Publication No. 5-62916, a polyimide friction material is actually produced that contains 71 to 89% by weight of polyimide resin.

However, this polyimide resin has the disadvantages of (1) being more expensive than phenol resin resulting in increased cost of the frictional material, and (2) requiring a large-scale and expensive production system as a result of having to be molded at high temperature and high pressure, thereby resulting in poor moldability and productivity. In addition, as in the friction material described in Japanese Patent Publication No. 5-62916, using a large amount of thermoplastic polyimide resins have the risk of (3) undergoing softening and melting due to frictional heat during braking, thereby causing phenomena such as fading and causing a decrease in the frictional properties of the friction material.

SUMMARY OF THE INVENTION

As a result of conducting extensive studies, the inventors found that by using an amorphous resin having a chain-like polymer structure as a constituent of a friction material, the capability of the friction material to follow the surface of the counterpart material at the point where frictional force is generated, namely spring property, can be improved, and noise and vibrations during friction can be inhibited. The inventors also found that in order to obtain effects that improve noise properties and vibration properties attributable to the amorphous resin described above while ensuring moldability, cost effectiveness and frictional properties of the friction material, it is important to arrange the amorphous resin in a highly dispersed state in other components and reduce the amount used instead of simply mixing a large amount of binder in the form of polyimide resin with other components that compose the friction material followed by molding as described in Japanese Patent Publication No. 5-62916.

The invention provides a friction material, which improves noise properties and vibration properties of the friction material while ensuring moldability, cost effectiveness and frictional properties, and a production method thereof.

A first aspect of the invention is a friction material, including: an amorphous resin having a chain-like polymer structure; and other components that configure the friction material and that are components other than the amorphous resin, wherein dispersion treatment is preliminarily carried out in which the amorphous resin is dispersed in at least one of component from among the other components.

Since the friction material of the first aspect includes an amorphous resin having a chain-like polymer structure, it has superior spring properties and is able to inhibit noise and vibrations during friction. In addition, as a result of preliminarily carrying out dispersion treatment on the amorphous resin and at least one of constituent other than the amorphous resin (other component), the amount of the amorphous resin used is reduced. As a result, superior noise properties and vibration properties can be realized while ensuring moldability, cost effectiveness and frictional properties of the friction material.

An example of the amorphous resin is at least one selected from the group consisting of polyimide, polyamidoimide, polycarbonate, polyphenylene ether, polyarylate, polysulfone and polyether sulfone. The content of the amorphous resin in the friction material is preferably 0.001 to 50 vol %.

An example of the dispersed state of the amorphous resin and the other components is a state in which the other components are coated with the amorphous resin. In the case a high friction component is included in the other components and at least the high friction component is coated with the amorphous resin in particular, noise properties and vibration properties of the friction material can be effectively improved. A component having a Mohs hardness of 6 or more may be used for the high friction component. In addition, an example in which the high friction component coated with the amorphous resin is further compounded with a fibrous component is able to inhibit separation of the high friction component from the surface of the friction material, thereby making it possible to stabilize frictional properties of the friction material.

Another example of a dispersed form of the amorphous resin and the other components is a state in which all other components that constitute the friction material, other than the amorphous resin, axe coated with the amorphous resin. In the case of coating all other components with the amorphous resin, the effect of improving spring properties of the friction material is enhanced, thereby further inhibiting the generation of noise and vibrations.

In addition, in the case of including a thermosetting resin as the other components, the thermosetting resin and a powder of the amorphous resin are dispersion mixed in the above-mentioned dispersion treatment. In this case, the amorphous resin can be dispersed in the gaps between other components together with the thermosetting resin without impairing the fluidity of the thermosetting resin during mixing and molding of the friction material raw materials. Examples of the thermosetting resin include at least one selected from phenolic resin, modified phenol resin, urea resin, melamine resin, benzoguanamine resin, amino resin, furan resin, unsaturated polyester resin, diallyl phthalate resin, allyl resin, alkyd resin, epoxy resin, thermosetting polyamidoimide resin, thermosetting polyimide resin and silicone resin. The amorphous resin powder may be spherical or flat and have a mean diameter of 1 µm or less. In addition, flat amorphous resin powder may have a thickness of 1 µm or less and a flat shape in which the length of one side of a square, whose area is same as a surface area in the planar direction of the amorphous resin powder, is 3 µm or less.

In the case of including a thermosetting resin as the other components, an example of another dispersed state of the amorphous resin and the thermosetting resin is polymerization of the amorphous resin and the thermosetting resin.

Moreover, an example of another dispersed arrangement of the amorphous resin and the other components is an example in which the other components are filled into pores of a porous body formed by the amorphous resin. An example in which sheets of the porous body are used and the porous body sheets are laminated in a plurality of layers can be used when a plurality of porous bodies filled with the other components are used in a friction material. In addition, different other components can also be filled into at least two of the porous bodies among the plurality of porous bodies. The porous body may also function as a base material component that retains the shape of the friction material.

A second aspect of the invention is a production method of a friction material, including: carrying out dispersion treatment in which an amorphous resin having a chain-like polymer structure is dispersed in at least one of other components that constitute the friction material and that are other than the amorphous resin.

Examples of the amorphous resin include at least one selected from polyimide, polyamidoimide, polycarbonate, polyphenylene ether, polyarylate, polysulfone and polyester sulfones. The content of the amorphous resin may be 0.001 to 50 vol %.

An example of dispersion treatment of the amorphous resin and the other components is treatment in which the other components are coated with the amorphous resin. Specific examples of coating treatment include a method in which the other components are coated with the amorphous resin in a fluid state, and a method in which the other components are coated with the amorphous resin in a non-fluid state.

In addition, in the case of including a high friction component as the other components, the noise properties and vibration properties of the friction material can be effectively improved by coating at least the high friction component with the amorphous resin in the above-mentioned dispersion treatment. A component having a Mohs hardness of 6 or more may be used for the high friction component. In addition, by compounding the high friction component coated with the amorphous resin with a fibrous component, separation of the high friction component from the surface of the friction material can be inhibited, thereby allowing the obtaining of a friction material that demonstrates stable frictional properties.

Another example of dispersion treatment is treatment in which all other components that constitute the friction material, other than the amorphous resin, are coated with the amorphous resin.

In addition, an example of dispersion treatment in the case of using a thermosetting resin as the other components is a method in which the thermosetting resin and a powder of the amorphous resin are dispersion mixed. Examples of the thermosetting resin include at least one selected from phenolic resin, modified phenol resin, urea resin, melamine resin, benzoguanamine resin, amino resin, furan resin, unsaturated polyester resin, diallyl phthalate resin, allyl resin, alkyd resin, epoxy resin, thermosetting polyamidoimide resin, thermosetting polyimide resin and silicone resin. The amorphous resin powder may be spherical or flat and have a mean diameter of 1 µm or less. In addition, flat amorphous resin powder may have a thickness of 1 µm or less and a flat shape in which the length of one side of a square, whose area is same as a surface area in a planar of the amorphous resin powder, is 3 µm or less.

In addition, in the case of using a thermosetting resin as the other components, an example of dispersion treatment with the amorphous resin is polymerization of the amorphous resin and the thermosetting resin.

Moreover, another example of dispersion treatment of the amorphous resin and the other components is a method in which the other components are filled into pores of a porous body formed by the amorphous resin. A plurality of the other components may be filled into pores of a plurality of the porous bodies and included in the friction material. At this time, sheets of the porous body may be used, and a plurality of the porous body sheets may be laminated. In addition, different other components may be filled into at least two of the plurality of porous bodies.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Figure 1A:
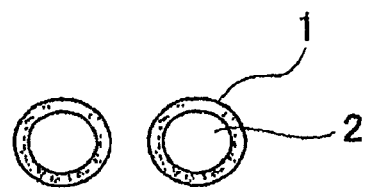
FIGS. 1A and 1B are schematic diagrams showing examples of dispersion treatment in which other components are coated with an amorphous resin in Specific Example (1)

The friction material of an embodiment of the invention includes an amorphous resin having a chain-like polymer structure, and dispersion treatment is preliminarily carried out in which the amorphous resin is dispersed with respect to at least one of other components that compose the friction material other than the amorphous resin. In this embodiment, the friction material includes an amorphous resin having a chain-like polymer structure (that may also be simply referred to as an amorphous resin) in a highly dispersed state in other components. In the embodiment, in order to realize high dispersion of the amorphous resin in the friction material, rather than simply mixing the amorphous resin with other components that compose the friction material, the amorphous resin and at least one of the other components that compose the friction material are preliminarily subjected to dispersion treatment, and the resulting dispersion treatment product is used to form the friction material.

The resin having a chain-like polymer structure has so-called thermoplasticity in which the bound state of repeating units that compose the polymer are linear, or in other words, one-dimensional, and is softened and deformed by heat. Thermoplastic resins are categorized into crystalline resins and amorphous resins. Crystalline resins have a property in which the polymer chains are arranged in an orderly manner. Conversely, amorphous resins are either unable to adopt a crystalline form or even if become crystalline, have extremely low crystallinity. Whether or not a resin is a crystalline resin or amorphous resin can be confirmed by investigating whether or not the resin exhibits a crystal diffraction pattern as determined by X-ray diffraction or electron beam diffraction and the like.

Since amorphous resins having a chain-like polymer structure enable the relative positions of polymers to change comparatively smoothly, they undergo deformation smoothly when subjected to stress. In a friction material, the material that supports each raw material that composes the friction material, namely a material that has spring properties, is a resin. Thus, whether or not a friction material deforms smoothly is determined by whether or not the resin is able to smoothly undergo deformation. Since frictional vibration of a friction material is determined by whether or not two friction surfaces follow each other smoothly during generation of shear stress during friction, smooth deformation of the resin under stress is an important factor that determines the presence or absence or magnitude of frictional vibration. On the basis of such principles, by using an amorphous resin as a constituent of a friction material, the capability of the friction material to follow the surface of the counterpart material at the point of generation of frictional force, namely the spring property of the friction material, can be improved, thereby making it possible to improve noise properties and vibration properties of the friction material.

On the other hand, the use of an amorphous resin as a binder component results in the problems described below. Namely, since amorphous resins are softened by heat, in the case of including a large amount thereof in a friction material in the manner of a binder component, the amorphous resin is melted and softened by frictional heat, thereby lowering the frictional properties of the friction material. In other words, there is the risk of the amorphous resin destabilizing the frictional properties of the friction material. In addition, since amorphous resins have thermoplasticity, the friction material must be molded at high temperature and high pressure, thereby reducing moldability and productivity of the friction material. Moreover, amorphous resins are more expensive than typical binder components in the form of phenol resins, thereby leading to increased cost of friction materials.

Therefore, in this embodiment of the invention, by preliminarily carrying out dispersion treatment on an amorphous resin with other components and arranging in a friction material in a highly dispersed state, in comparison with the case of using the amorphous resin as a binder component, the amount of amorphous resin used can be reduced considerably, thereby making it possible to improve noise properties and vibration properties of the friction material through the use of an amorphous resin while inhibiting the occurrence of problems caused by use of an amorphous resin as described above. Here, other components refer to at least one of component among those components that compose the friction material other than the amorphous resin, and may be any of a base material component, binder component, filler component or other components to be described later, or two or more thereof. In addition, dispersion treatment refers to treatment that enables dispersibility of the amorphous resin and other components to be improved, and may employ a method such as (1) treatment in which the other components are coated with the amorphous resin, (2) treatment in which a powder of the amorphous resin is dispersion mixed into a thermosetting resin, (3) treatment in which the amorphous resin is polymerized with a thermosetting resin, (4) treatment in which the other components are filled into pores of a porous body formed by the amorphous resin, or any other arbitrary method as will be described later.

There are no particular limitations on the amorphous resin. However, it is necessary that macroscopic properties of highly linear polymers include heat resistance and less variation of the ability to deform under stress, namely elastic modulus. Consequently, the glass transition temperature of the amorphous resin is preferably 150° C. or higher, particularly preferably 200° C. or higher and more preferably 250° C. or higher. In addition, the material that supports each raw material of the friction material (material having spring properties) is required to have a high compression modulus. Consequently, the compression modulus of the amorphous resin is preferably 1 GPa or more, particularly preferably 2 GPa or more, and more preferably 3 GPa or more.

Specific examples of amorphous resins include at least one selected from polyimide, polyamidoimide, polycarbonate, polyphenylene ether, polyarylate, polysulfone and polyethersulfone; and polyimide, polyamidoimide, polycarbonate and polyphenylene ether resins are used preferably. Polyamidoimide or polyimide resin having a high glass transition temperature and high compression modulus is used particularly preferably.

The following provides an explanation of an aromatic polyimide obtained by polymerization or imidization from an aromatic tetracarboxylic acid component and an aromatic diamine component. Examples of aromatic tetracarboxylic acid components include aromatic tetracarboxylic acids such as pyromellitic acid, 3,3',4,4'-biphenyl tetracarboxylic acid, 2,3,3',4'-biphenyl tetracarboxylic acid, 3,3',4,4'-benzophenone tetracarboxylic acid, bis(3,4-dicarboxyphenyl)ether, bis (3,4-dicarboxyphenyl) thioether, bis(3,4-dicarboxyphenyl) methane or 2,2-bis(3,4-dicarboxyphenyl) propane, or dianhydrides of these acids. A plurality of components can also be used in combination. Examples of aromatic diamine components include 4,4'-diaminodiphenyl ether, 4,4'-diaminadiphenyl thioether, 4,4'-diaminodiphenyl methane, 4,4'-diaminobenzophenone and o-, m- or p-phenylenediamine. A plurality of components may also be used in combination. An example of a specific production method consists of polymerizing and imidizing the aromatic tetracarboxylic acid component and the aromatic diamine component in an organic polar solvent at a comparative high temperature to precipitate in the form of a high molecular weight aromatic polyimide resin powder, or polymerizing the aromatic tetracarboxylic acid component and the aromatic diamine component in an organic polar solvent at a comparatively low temperature to form a high molecular weight aromatic polyamic acid, adding a solvent in which the polyamic acid is insoluble to the polymerization liquid to precipitate an aromatic polyamic acid powder, and imidizing the powder by heating (imidocyclization of polyamic acid by a dehydration reaction of acid-amide bonds) to produce an aromatic polyimide resin powder.

Only one amorphous resin may be used alone or two or more may be used in combination. The content of the amorphous resin in the friction material is preferably 50 vol % or less, particularly preferably 40 vol % or less and more preferably 30 vol % or less, and preferably 0.001 vol % or more, particularly preferably 0.01 vol % or more, and more preferably 0.1 vol % or more. If the content of the amorphous resin exceeds 50 vol %, there is the risk of the frictional properties, moldability and productivity of the friction material decreasing. On the other hand, in the case the content of the amorphous resin is less than 0.001 vol %, the effect of the amorphous resin of improving spring properties of the friction material is not obtained, thereby resulting in the risk of being unable to adequate improve the noise properties and vibration properties of the friction material. Furthermore, in the friction material of this embodiment, depending on the form of dispersion treatment that enables a highly dispersed arrangement, the amorphous resin acts as, for example, a binder component, a base material component, a filler component or as a plurality of these components. In this embodiment, even in the case the amorphous resin acts as a binder component, for example, other binder components may also be used.

The base material component is a component that is used to retain the shape and ensure the strength of the friction material while also enhancing the friction coefficient thereof, and a conventional base material may be used. Specific examples of base material components include inorganic fiber and organic fiber. Examples of inorganic fiber include steel fiber, copper fiber, glass fiber, ceramic fiber, potassium titanate fiber, rock wool, silicate fiber, alumina fiber, stainless steel fiber, titanium fiber, silica fiber, silica-alumina fiber, boron fiber, magnesia fiber and carbon fiber. Examples of organic fiber include at least one of aramid fiber, hemp, cotton, aromatic polyamide fiber, linter pulp, wood pulp, synthetic pulp, polyester-based fiber, polyamide-based fiber, polyimide-based fiber, polyvinyl alcohol modified fiber, polyvinyl chloride fiber, polypropylene fiber, polybenzoimidazole fiber, acrylic fiber, phenol fiber and cellulose fiber. Aramid fiber is used particularly preferably from the viewpoints of heat resistance, strength and cost. One of base material component may be used alone, or two or more may be used in combination.

The binder component is a component used to bind the base material component, filler component and other constituents, and a conventional binder may be used. Specific examples of binder components include phenol resin, modified phenol resin, urea resin, melamine resin, benzoguanamine resin, amino resins other than these resins, furan resin, unsaturated polyester resin, diallyl phthalate resin, allyl resins other than diallyl phthalate resin, alkyd resin, epoxy resin, thermosetting polyamidoimide resin, thermosetting polyimide resin, silicone resin and other thermosetting resins. Phenol resin and modified phenol resin are particularly preferable from the viewpoints of heat resistance, cost and production ease. One of binder component may be used alone or two or more may be used in combination.

The filler component, that is a component other than the amorphous resin, base material component and binder component, is used to adjust various properties of the friction material, such as wear resistance, heat resistance, friction coefficient, stability or coating strength, and a conventional filler component may be used. Specific examples of filler components include friction modifiers, wear modifiers and lubricants. Specific examples of organic filler components include cashew dust and rubber dust. Specific examples of inorganic filler components include barium sulfate, calcium hydroxide, calcium carbonate, mica, talc and metal powder. Examples of lubricants include graphite and metal sulfides.

One of filler component may be used alone or two or more may be used in combination. In addition, there are no particular limitations on the form of the filler component, and may be in the form of, for example, spheres, plates or fibers.

In this embodiment, the highly dispersed state of the amorphous resin in the friction material is realized by preliminarily carrying out dispersion treatment on the amorphous resin and other constituents other than the amorphous resin (which may simply be referred to as other components) and forming the friction material.

In addition, the amorphous resin, that is the essential component of the embodiment, acts as a base material component, acts as a binder component or acts as a filler component depending on the form of dispersion treatment as was previously described. For this reason, there are cases in which the friction material of this embodiment does not include at least one of each component previously indicated as examples of base material components, binder components and filler components.

The following provides an explanation of the dispersion treatment carried out on the amorphous resin and other components using Specific Examples (1) to (4).

Figure 1B:
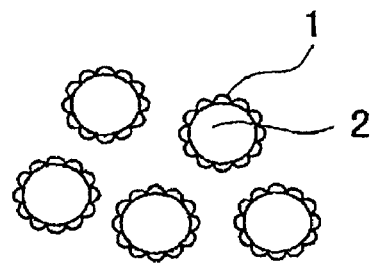

(1) Dispersion Treatment in which Other Components are Coated with Amorphous Resin The dispersed state of the amorphous resin with respect to the other components can be enhanced by preliminarily coating the other components, typically the base material component and/or filler component, with the amorphous resin. The other components coated with the amorphous resin (which may be referred to as coated components) may be only one or two or more, and may be all of the other components, namely all constituents other than the amorphous resin. In the case of a portion of the other components being coated with the amorphous resin, the other components coated with the amorphous resin and the remaining other components are mixed. There are no particular limitations on the method used to coat other components with the amorphous resin, and a method may be suitably determined according to the combination of the amorphous resin and other components, the form, size, type and amount added of the other components, and the type and amount added of the amorphous resin. For example, a coated component 2 may be coated with an amorphous resin 1 in a fluid state (see FIG. 1A), or the coated component 2 may be coated with the amorphous resin 1 in a non-fluid state (see FIG. 1B).

A typical wet method is an example of a method used to coat the coated components with an amorphous resin in a fluid state. Namely, a molten amorphous resin or a dissolved amorphous resin is adhered to the surface of the coated components. For example, an amorphous resin in a fluid state (melted or dissolved) can be coated or sprayed onto the surface of the coated components, or the coated components can be immersed in an amorphous resin in a fluid state followed by mixing and suitably drying to form a coated film of the amorphous resin on the surface of the coated components. In the case of immersing the coated components in a molten amorphous resin, carrying out immersion in a vacuum allows the obtaining of a uniform coated state.

In the case of coating an amorphous resin in a fluid state in this manner, together with being able to form a uniform and stable coated film, coating treatment can be carried out all at once for a large amount of coated components or for a plurality of coated components, thereby resulting in extremely high productivity. On the other hand, in the case of using a plurality of coated components, carrying out coating treatment for each coated component offers the advantage of being able to set coating treatment conditions that are suitable for each coated component. The coated components are preferably uniformly coated with a film-like amorphous resin over the entire surface thereof. In addition, the amorphous resin may also be adhered to the surface of the coated components in the form of islands. In the case of coating the amorphous resin using a wet method, the amorphous resin is required to have fluidity that allows it to be melted by heat or dissolved in a solvent. Alternatively, monomer that composes the amorphous resin may be put into a fluid state, the coated components may be coated with the monomer in a fluid state, and the monomer may be polymerized on the surface of the coated components.

A typical dry method is an example of a method used to coat the coated components with an amorphous resin in a non-fluid state. Specific examples of such methods include adhering a powder of the amorphous resin to the coated components having an adhesive coated on the surface thereof, adhering a powder of a monomer of the amorphous resin to the coated components having an adhesive coated on the surface thereof and then polymerizing the monomer on the coated components, introducing a heated coated component into a fluid layer composed only of an amorphous resin powder in a non-fluid state and coating, mutually colliding an amorphous resin powder and a raw material of the other components with a ball mill or jet mill to adhere the amorphous resin powder on the surface of the coated component, and granulating the amorphous resin and the coated component with a granulating machine such as a disc pelleter.

In the case of coating with an amorphous resin in a non-fluid state in this manner, an amorphous resin having low solvent solubility or low meltability can be used. In other words, a wider range of materials can be selected for the amorphous resin. In addition, since the amount of amorphous resin used can be reduced in comparison with a wet method, the cost of the friction material can also be reduced. Moreover, since dry methods do not use a solvent as compared with wet methods, a dissolution step, drying step and solvent extraction step are no longer required, which together with simplifying the production process resulting in superior productivity, also places a smaller burden on the environment. In addition, a dry method also offers the advantage of being able to uniformly coat the amorphous resin on the surface of the coated components. In the case of using a plurality of coated components, coating treatment may be carried out for each component, or may be carried out collectively on a plurality of coated components. The coated components are preferably uniformly coated with a film-like amorphous resin over the entire surface thereof. In addition, the amorphous resin may also be adhered to the surface of the coated components in the form of islands.

Figure 2A:
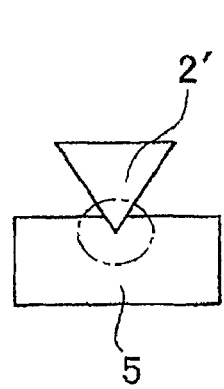
FIGS. 2A, 2B and 2C are schematic diagrams showing in Specific Example (1) portions where a high friction component and a counterpart material of a friction material make contact in the case of coating the high friction material with an amorphous resin in dispersion treatment in which other components are coated with the amorphous resin.
Figure 2B:
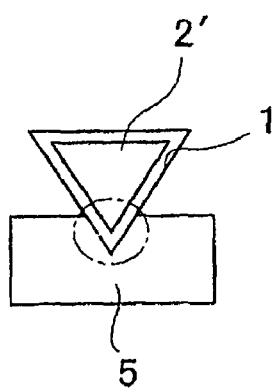
Figure 2C:
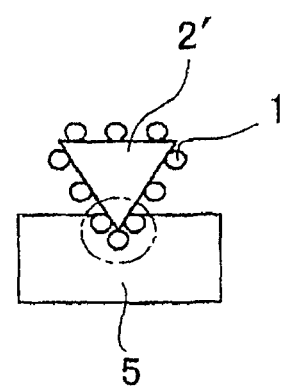

The other components coated with the amorphous resin preferably include a high friction component in particular. The high friction component refers to a type of filler component that acts to increase the friction coefficient of the friction material. More specifically, in FIGS. 2A, 2B and 2C, the insides of the circles indicated with single-dot broken lines indicate portions where a friction material raw material (high friction component) and a counterpart material (typically a disc rotor) 5 make contact, and frictional force is generated at these portions. Frictional force changes and vibrations occur as a result of changing the conditions of contact within the circles. For this reason, coating the high friction component 2' with the amorphous resin 1 results in a structure such that the friction material raw material (high friction component) is supported by a spring. Thus, even if the conditions of contact (such as surface irregularities in the counterpart material such as a disc rotor) change, since the spring structure has a cushioning action, the change in the conditions of contact is alleviated thereby making it difficult for vibrations to occur. In the embodiment as described above, improvement of noise properties and improvement of vibration properties of a friction material can be effectively enhanced by an amorphous resin while retaining the frictional properties of the friction material attributable to the high friction component. In particular, by coating only a high friction component with an amorphous resin, noise properties and vibration properties of the friction material can be improved more effectively while ensuring moldability, cost effectiveness and frictional properties of the friction material.

The high friction component refers to a metal component or oxide component and the like having a Mohs hardness of 4 or more and preferably 6 or more, specific examples of which include magnesium oxide, zirconium oxide, aluminum oxide, silicon carbide and zirconium silicate. Only one of high friction component may be used alone, or two or more types may be used in combination. In addition, the high friction component coated with the amorphous resin may be all high friction components that compose the friction material or only a portion of the high friction components. There are no particular limitations on the shape of the high friction component, and may be in the form of spheres or fibers. In addition, although there are no particular limitations on the particle diameter of the high friction component, it is preferably 0.001 to 500 μm and particularly preferably 0.1 to 100 μm as determined based on an equivolume sphere.

There is the risk of the high friction component separating from the surface of the friction material due to a decrease in the retention force thereof on the surface of the friction material caused by deterioration of the binder component or softening and deterioration of the amorphous resin accompanying an increase in temperature of the friction material. Separation of the high friction component leads to a decrease in frictional force of the friction material, reduces braking effectiveness, or in the state in which the separated high friction component remains on the surface of the friction material, leads to uneven wear of the surface of the friction material resulting in poor wear resistance of the friction material due to sliding contact between the friction material and the counterpart material. Therefore, the high friction component coated with the amorphous resin and subjected to dispersion treatment is further compounded with a fibrous component. Compounding with a fibrous component results in the high friction component being incorporated in the fibrous component, thereby improving retention force of the high friction component to the friction material and making it possible to inhibit separation of the high friction component from the surface of the friction material. As a result, stability of frictional properties of the friction material and wear resistance can be improved.

Examples of fibrous components include those composed of the same materials as those listed as examples of the base material component, and although there are no particular limitations on the form thereof, fiber diameter and fiber length thereof are selected according to the particle diameter of the high friction component coated with the amorphous resin that inhibits separation. Normally, fiber diameter is preferably 0.001 to 2000 µm and particularly preferably 1 to 30 µl, and fiber length is preferably 0.1 µm to 50 mm and particularly preferably 1 to 30 mm. In addition, aspect ratio (fiber length/fiber diameter) is preferably 3 to 1000 and particularly preferably 10 to 200. Aramid fibers are selected particularly preferably from the viewpoints of adhesion to the amorphous resin that coats the high friction component, heat resistance, strength and cost. One of fibrous component may be used alone, or two or more may be used in combination.

There are no particular limitations on the method used to compound the fibrous component with the high friction component coated with the amorphous resin, and an example of such a method consists of adhering the high friction component coated with the amorphous resin to the fibrous component using an adhesive. Examples of adhesives include soft substances such as starch, latex (rubber) or casein, as well as self-curing and solvent-type resin adhesives. Self-curing resin adhesives are selected particularly preferably from the viewpoint of adhesive strength. The adhesive is coated onto the fibrous component followed by mixing with the high friction component coated with the amorphous resin, or the adhesive is coated onto the high friction component coated with the amorphous resin followed by mixing with the fibrous component, thereby compounding the adhesive, high friction component coated with the amorphous resin, and the fibrous component.

The ratio between the high friction component coated with the amorphous resin and the fibrous component compounded with the high friction component is set as is suitable. All of the fibrous component used as the above-mentioned base material component may be compounded with the high friction component, or a portion of the fibrous component of the base material component may be compounded with the high friction component. The specific ratio between the high friction component coated with the amorphous resin and the fibrous component in terms of the volume ratio of the high friction component itself (before coating with the amorphous resin) to the fibrous component (high friction component: fibrous component) is preferably 1:1 to 1:100 and particularly preferably 1:5 to 1:20.

A complex of other components coated with the amorphous resin (including the high friction component) or the high friction component coated with the amorphous resin and the fibrous component may be mixed with other components as necessary followed by molding and curing to form a friction material. More specifically, a complex of other components coated with the amorphous resin and/or high friction component coated with the amorphous resin and the fibrous component is mixed with other components that composes the friction material using a mixer such as an Eirich mixer, universal mixer, Lodige mixer or V-blender. Next, the resulting mixer is hot-press molded with a molding metal mold (at, for example, 130 to 180° C. and 5 to 100 MPa) to obtain a molded body. The hot-pressing time during hot-press molding may be set as is suitable. The mixture may be pre-molded with a molding metal mold prior to hot-press molding by a molding metal mold, followed by hot-press molding of the resulting preliminarily molded body. The resulting molded body is then cured by further subjecting to heat treatment at 150 to 300° C. The duration of heat treatment may be set as is suitable. Following heat treatment, the molded body is ground and sized as necessary to obtain a friction material.

(2) Dispersion Treatment in which Powdered Amorphous Resin is Dispersion Mixed into Thermosetting Resin In the case of using a thermosetting resin for the binder component, by preliminarily mixing and dispersing a powder of the amorphous resin into a thermosetting resin, a highly dispersed state of the amorphous resin can be realized during mixing of the dispersion mixture of the thermosetting resin and the amorphous resin with constituents other than the thermosetting resin and the amorphous resin. Here, the thermosetting resin dispersion mixed with the powdered amorphous resin may be a liquid or a powder. In addition, during dispersion mixing of the thermosetting resin and the amorphous resin, the amorphous resin retains a solid state and does not form a solid solution with the thermosetting resin.

Although there are no particular limitations on the shape or size of the amorphous resin powder, it is preferably in the form of spheres having a mean particle diameter of 1 µm or less. In this case, since the fluidity of the dispersion mixed thermosetting resin is not impaired when in a molten state, the amorphous resin enters the gaps between other components when the mixed dispersion of the amorphous resin powder and the thermosetting resin is mixed with other components. Thus, the spring properties of the friction material are enhanced, thereby making it possible to improve the noise properties and vibration properties thereof. The mean particle diameter of a spherical amorphous resin powder is particularly preferably 100 µm or less and more preferably 20 µm or less to facilitate entry into the gaps between other components. On the other hand, the mean particle diameter is preferably 0.01 µm or more and particularly preferably 0.1 µm or more to absorb vibrations by allowing the construction of a spring structure that supports each raw material that composes the friction material. In addition, the spherical powder preferably has high roundness. Here, the mean particle diameter of the amorphous resin powder refers to that of primary particles, and can be measured by image analysis using an electron microscope or light microscope, or by laser diffraction or sieve analysis.

On the other hand, in the case the amorphous resin powder has a flat shape, since the contact surface area with other components per unit weight is larger than that of spherical particles, the amount of amorphous resin used can be reduced. Here, in contrast to the lengths in the x, y and z directions being nearly equal in the case of spherical particles, a flat shape refers to a length m in the x, y or z direction having the shortest length being ½ or less, and preferably ⅓ or less, relative to the length in at least one of the other directions. The length m in a flat shape is taken to be the thickness, while the directions defined by the remaining two directions are taken to be planar directions.

An example of a flat shape is a plate, and specifically, preferably a flat shape in which the thickness is 1 μm or less and the length of one side of a square, whose area is same as the surface area in the planar direction, is 3 μm or less, particularly preferably a flat shape in which the thickness is 0.6 μm or less and the length of one side of the square as described above is 2 μm or less, and more preferably a flat shape in which the thickness is 0.4 μm or less and the length of one side of the square as described above is 1.5 μm or less. On the other hand, in order to construct a spring structure that supports each raw material that composes the friction material, a flat amorphous resin powder preferably has a thickness of 0.01 μm or more and particularly preferably 0.1 μm or more, while the length of one side of the square as described above is preferably 0.03 μm or more and particularly preferably 0.3 μm or more. In addition, the value obtained by dividing the length of one side of the square as described above by the thickness is preferably 3 or more, particularly preferably 4 or more and more preferably 5 or more.

A mixture of spherical shapes and flat shapes is preferably used for the amorphous resin powder from the viewpoints of ensuring fluidity of the thermosetting resin and ensuring a contact surface area for the amorphous resin with other components. The mixing ratio of spherical and flat shapes at this time may be set as is suitable.

There are no particular limitations on the thermosetting resin provided it can be used as a binder component of a friction material, and examples include those listed as examples of the binder components previously described. Phenol resin and modified phenol resin are used particularly preferably from the viewpoints of strength, heat resistance and cost. The amorphous resin and thermosetting resin that undergo preliminary mixing and dispersion may respectively be the entire amounts thereof that compose the friction material, or only a portion of each component may be subjected to the above-mentioned dispersion mixing treatment, while the remainder may be added during subsequent mixing treatment with other components. Any arbitrary dispersion mixing method may be employed for dispersion mixing the amorphous resin powder and the thermosetting resin, and specific examples of such methods include introducing a fine amorphous resin powder into a melted thermosetting resin (such as phenol resin) followed by dispersion, dispersing the thermosetting resin (such as phenol resin) and the amorphous resin powder in a solvent, and adding the amorphous resin during polymerization of the thermosetting resin (such as phenol resin). In particular, the method in which a fine amorphous resin powder is introduced into a melted phenol resin followed by dispersion allows mixing to be carried out without melting or dissolving the amorphous resin.

The dispersion mixture of the amorphous resin and the thermosetting resin is then mixed with other components as necessary in the same manner as other components coated with the amorphous resin of (1) above, followed by molding and heat treatment, and further carrying out heat treatment, curing and grinding and sizing as necessary to obtain a friction material.

(3) Dispersion Treatment in which Thermosetting Resin and Amorphous Resin are Polymerized In the case of using a thermosetting resin as a binder component, the thermosetting resin and the amorphous resin can be dispersed at the molecular level by preliminarily polymerizing the thermosetting resin and the amorphous resin. Thus, a highly dispersed amorphous resin can be realized when mixing other constituents other than the thermosetting resin and the amorphous resin. As a result, the amount of amorphous resin used can be reduced, and noise properties and vibration properties of the friction material can be effectively improved while suppressing increases in costs and improving moldability.

There are no particular limitations on the form of the polymer of the thermosetting resin and amorphous resin, examples of which include a form that has the basic backbone of the thermosetting resin as the main chain backbone thereof and in which constituent units of the amorphous resin are bound to side chains in the form of pendants, a form that has the basic backbone of the amorphous resin as the main chain backbone thereof and in which constituent units of the thermosetting resin are bound to side chains in the form of pendants, as well as block copolymers, random copolymers and alternating copolymers.

Although there are no particular limitations on the polymerization method, since the temperature at which the amorphous resin enters a fluid state and the temperature at which the thermosetting resin enters a fluid state have a high tendency to differ considerably, a method is preferably used by which a monomer or oligomer of the thermosetting resin is polymerized in the presence of the amorphous resin. An example of a specific method is described to follow. Namely, in the case of a method for polymerizing the amorphous resin with the thermosetting resin, graft polymerization is preferable in order to bring out the properties of the amorphous resin while taking advantage of the properties of the thermosetting resin. Graft polymerization allows the obtaining of a polymer that incorporates the thermosetting resin for the basic backbone the amorphous resin as side chains by first activating the thermosetting resin by irradiating the thermosetting resin prior to curing (in the form of a monomer, oligomer or polymer) with short wavelength visible light such as ultraviolet light or high-energy particles (such as an electron beam), and then allowing the amorphous resin to react therewith while in the activated state.

The polymerization ratio of the amorphous resin and the thermosetting resin is such that the ratio of the amorphous resin to the entire resin in terms of the constituent units (monomers) of each resin is preferably 20 to 80%. The amorphous resin and thermosetting resin that undergo preliminary polymerization are each not required to be the entire amounts thereof that compose the friction material, but rather only a portion of each component used may be polymerized.

A polymer of the amorphous resin and the thermosetting resin are mixed with other components as necessary in the same manner as other components coated with the amorphous resin in (1) above, followed by molding and heat treatment, and further carrying out heat treatment, curing and grinding and sizing as necessary to obtain a friction material.

(4) Dispersion Treatment in which Other Components are Filled into Pores of a Porous Body Formed from Amorphous Resin A highly dispersed arrangement of the amorphous resin in a friction material can be realized by forming a porous body with an amorphous resin and filling other components into pores of the porous body. In this embodiment, a highly dispersed arrangement of the amorphous resin that forms the walls of the porous body is realized with respect to other components filled into each of the pores of the porous body. In addition, as a result of the amorphous resin that forms the porous body being present continuously in all three dimensional directions in the friction material, the spring properties of the friction material are improved and the noise properties and friction properties of the friction material are further enhanced. In addition, together with other components being retained within the porous body, since the strength and shape of the friction material is ensured by the porous body, in this embodiment, the amorphous resin that composes the porous body acts as a base material component of the friction material. For this reason, in this embodiment, the amount of a fibrous component such as inorganic fiber or organic fiber, which is conventionally used as base material component that has functions such as retaining the shape of ensuring the strength of the friction material, can be reduced, or the use of a fibrous component is not required. In addition, the amount of binder component that binds the components that compose the friction material can also be reduced.

Many fibrous components that act as base material components are expensive, and there are concerns regarding their use in terms of the environment as well. Moreover, in addition to destabilization of friction wear properties of the friction material caused by fibrous components, there is also concern over these components having a detrimental effect on noise properties and vibration properties. In particular, organic fibers undergo strength deterioration and thermal decomposition when exposed to high temperatures attributable to frictional heat during use, resulting in a decrease in incorporation ability, which is one of the causes of decreased friction material durability. Namely, although fibrous components incorporate constituents such as the filler component due to the ability of the fibers to become intertwined with each other, if strength deteriorates or the fibers decompose due to generation of heat during friction, this intertwining effect decreases. Consequently, the friction material is damaged or decreases in strength, thereby resulting in the risk of the friction material being no longer able to maintain stable performance over a long period of time. For this reason, although it is desirable to reduce the amount of fibrous component used, it is difficult to make such a reduction from the viewpoints of retaining the shape and strength of the friction material.

In contrast, in the case of using a base material component in the form of a porous body formed by using an amorphous resin, since other friction material raw materials are retained in the gaps of the porous body as previously described, the effect is obtained by which fibrous components (reinforcing fibers) are either unnecessary or the amount at which they are included can be reduced. In addition, since other friction material raw materials are retained in individual hole units, the amount of binder component can also be reduced. In addition, since the porous body forms a three-dimensional network, there is the effect of the amorphous resin being present throughout the friction material in the form of a raw material-retaining spring structure. As a result, the amounts used of the fibrous component, binder component and other components such as a filler component can be reduced overall, thereby making it possible to solve the above-mentioned problems. Thus, by forming a porous body with an amorphous resin and filling other components into pores of the porous body, together with improving noise properties and vibration properties of the friction material as previously described, moldability and cost effectiveness can also be improved. Moreover, problems such as destabilization of friction wear properties attributable to reducing the amount of fibrous component used as previously described and cost increases can also be solved. Furthermore, pore diameter of the porous body and void diameter of the friction material can be measured with, for example, a mercury porosimeter.

Although there are no particular limitations on the specific structure of the porous body formed from the amorphous resin, the porosity is preferably 30 to 95% and particularly preferably 40 to 90% from the viewpoints of heat resistance and inhibiting noise by spring effects. In addition, the mean pore diameter of the porous body is preferably 50 to 3000 μm and particularly preferably 100 to 1000 μm from the viewpoints of inhibiting noise by support spring effects and permeability of raw materials. In addition, the pores are required to be continuous to allow other components to be filled into the pores.

Any arbitrary technology may be used as the method for forming the porous body with the amorphous resin. For example, the porous body may be formed by mixing the amorphous resin with a foaming agent, melting at a high temperature and then cooling, or by dissolving the amorphous resin with a solvent and then rapidly depressurizing to evaporate off the solvent.

Alternatively, a method may be employed in which the amorphous resin is molded by melting or dissolving with a solvent and then injecting into a mold having a honeycomb structure and the like, or the amorphous resin may be produced in the form of a large number of cylinders, and these may be mutually adhered to form a honeycomb structure.

Other components filled into the porous body normally consist of essential components in the form of the binder component and the filler component, and is preferably a raw material mixture that does not include a base material component such as the above-mentioned inorganic fibers or organic fibers. There are no particular limitations on the specific composition of the raw material mixture, and may be suitably selected. Normally, the binder component is preferably included at 5 to 60 vol % and the filler component is preferably included 0.1 to 90 vol %. Furthermore, in the specific examples, the above-mentioned inorganic fibers and organic fibers or other conventional base material components as well as amorphous resin may be included in the components filled into the porous body. There are no particular limitations on the method used to fill other components (raw material mixture) into the porous body, and the raw material mixture may be pressed into the porous body using conventional methods. Specific examples of such methods include dispersing the raw material mixture in a liquid to obtain a slurry followed by filling the slurry by pressing into the porous body, or placing the raw material mixture on the porous body followed by applying vibrations to fill the raw material mixture into the pores thereof.

Figure 3A:
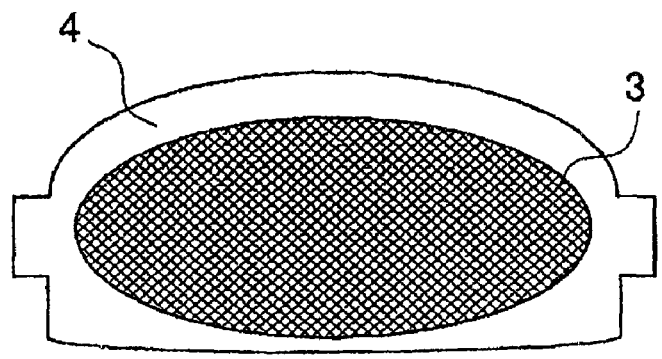
FIGS. 3A, 3B and 3C are schematic diagrams showing examples of dispersion treatment in which other components are filled into pores of porous body formed by an amorphous resin in Specific Example (4).
Figure 3B:
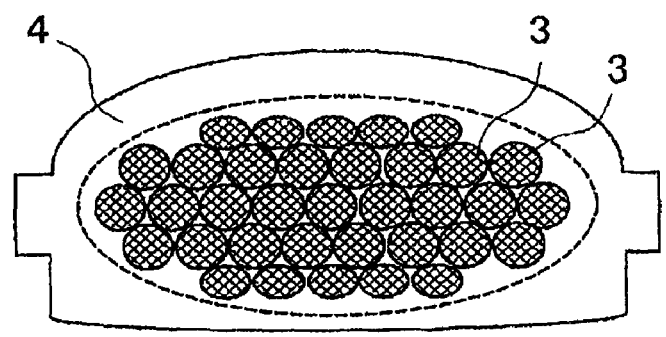
Figure 3C:
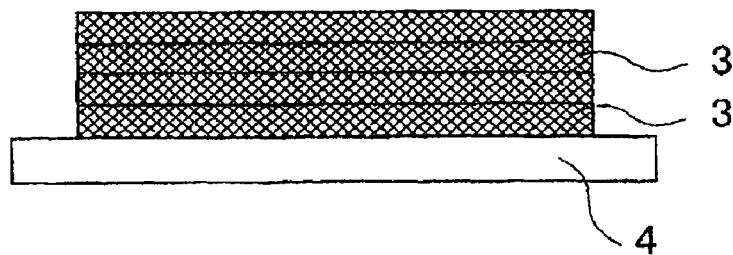

There may be one or two or more of the porous body formed from the amorphous resin that composes the friction material. For example, in the case of using only one porous body, a porous body 3 having the same external shape as the friction material to be produced may be used as shown in FIG. 3A, and other components may be filled into the porous body 3 to obtain a preliminary molded body of the friction material. Alternatively, two or more porous bodies may be used as in FIG. 3B and FIG. 3C. In this case, a porous body 3 having a smaller bulky form than the friction material to be produced may be used (see FIG. 3B), and a plurality of the porous bodies filled with other components may be adhered followed by molding to obtain a preliminary molded body of the friction material. Alternatively, a sheet of the porous body 3 that is thinner than the friction material to be produced may be used (see FIG. 3C), and the porous bodies filled with other components may be laminated to obtain a preliminary molded body followed by molding. Here, a bulky form refers to spheres, blocks or chips and the like. Furthermore, FIGS. 3A, 3B and 3C show a backing metal 4 that composes a friction member together with a friction material of the specific examples. The shape of the backing metal 4 is not limited to that in FIGS. 3A, 3B and 3C.

In the case of using a porous body having the same shape as the friction material to be produced, there are advantages such as uniformly high strength and eliminating the need for treatment for adhering a plurality of porous bodies since the porous body is continuous with the friction material. On the other hand, due to the large size of the porous body, it is difficult to fill a mixture of other components into the pores of the porous body.

In contrast, in the case of using a plurality of porous bodies, since the porous body can be reduced in size and thickness, filling of a mixture of other components therein is both easy and uniform. Moreover, by arranging each porous body in the friction material while changing the composition of other components filled into each porous body or the structure of the porous body and the like, an anisotropic friction material can be obtained that has different frictional properties and friction wear properties in the direction of the friction surface and the direction of thickness. For example, uneven wear of the friction surface can be inhibited by arranging a material having superior wear resistance in a portion that forms a friction surface susceptible to uneven wear, or by arranging a porous body filled with a mixture of other components having a high content of graphite or sulfide having superior lubricity to impart high friction wear. Alternatively, a porous body filled with a mixture of other components having a high content of a raw material that imparts flexibility in the form of an organic filler may be arranged in a portion that becomes a new friction surface, which is exposed on the surface of the friction material as a result of wear of the initial friction surface, thereby imparting high spring properties. In this case, even if the thickness of the friction material decreases, favorable noise properties and vibration properties can be maintained. In addition, by arbitrarily designing the elastic modulus of the friction material in the direction of thickness by changing the porosity, pore diameter and components in the direction of thickness of the friction material, the design is able to demonstrate optimal spring properties even if the friction material becomes worn.

There are no particular limitations on the method used to produce a porous body having a smaller bulky form than the friction material to be produced, and a method similar to that used for the porous body described above may be employed to obtain a desired shape and size. The porous body may also be crushed prior to use. The size and shape of a plurality of bulky porous bodies that compose the friction material may be mutually different. Although there are no particular limitations on the size of a bulky porous body, normally the diameter is preferably 1 to 30 mm and particularly preferably 3 to 10 mm as determined based on an equivolume sphere from the viewpoints of thickness of the friction material, filling properties of other components that compose the friction material, and interlayer strength. A bulky porous body filled with a mixture of other components may be, for example, further mixed with the mixture of filled components to prepare a secondary mixture, and this secondary mixture may be molded as a preliminary molded body of the friction material.

In addition, there are no particular limitations on the method used to produce a porous body sheet, and a method similar to that used for the porous body described above may be used to obtain a desired shape and size. Although there are no particular limitations on the thickness of the porous body sheet, normally the thickness is preferably 0.2 to 50 mm and particularly preferably 3 to 10 mm from the viewpoints of the thickness of the friction material, filling properties of other components that compose the friction material, and interlayer strength. An adhesive such as a thermosetting resin may be used between porous sheets filled with a mixture of other components as necessary, followed by joining the sheets and molding in the form of a preliminary molded body of the friction material.

Production of Friction Material

EXAMPLE 1

A high friction component (zircon: $ZrSiO_4$) and an amorphous resin (polyamidoimide: PAI) were charged into a kneader heated to 250° C. at a volume ratio of $ZrSiO_4$/PAI of 8/2 followed by adequately kneading both components to obtain a mixture of zircon and PAI. Next, this mixture was crushed to a prescribed diameter with a crusher using a rotary vane to obtain zircon coated with PAI ($ZrSiO_4$/PAI coating). Each of the raw materials shown in Table 1 (blending ratio: vol %) was mixed to uniformity for 5 minutes using a vertical mixer to obtain a friction material raw material mixture. Hot-press molding was then carried out by charging the friction material raw material mixture into a metal mold heated to 150° C. followed by heating for 10 minutes at 200 kg/cm² (19.6 MPa). Subsequently, curing was carried out for 2 hours at 200° C. to obtain a friction material,

TABLE 1

| Components (vol %) | | Example 1 | Comparative Example 1 | Comparative Example 2 |
|---|---|---|---|---|
| Fibrous component | Aramid fiber | 5 | 5 | 5 |
| | Copper fiber | 10 | 10 | 10 |
| | Glass fiber | 10 | 10 | 10 |
| Filler component | Graphite | 5 | 5 | 5 |
| | $ZrSiO_4$/PAI coating | 10 (8/2) | — | — |
| | $ZrSiO_4$ (no coating) | — | 8 | 8 |
| | Mica | 10 | 10 | 10 |
| | Barium sulfate | 30 | 30 | 30 |
| Binder component | PAI | — | — | 2 |
| | Phenol resin | 20 | 22 | 20 |
| Total | | 100 | 100 | 100 |

COMPARATIVE EXAMPLE 1

Each of the raw materials shown in Table 1 was mixed to uniformity for 5 minutes using a vertical mixer to obtain a friction material raw material mixture. The resulting friction material raw material mixture was then used to produce a friction material in the same manner as Example 1.

COMPARATIVE EXAMPLE 2

Each raw material shown in Table 1 was mixed to uniformity for 5 minutes using a vertical mixer without preliminarily coating the $ZrSiO_4$ with PAI to obtain a friction material raw material mixture. The resulting friction material raw material mixture was then used to produce a friction material in the same manner as Example 1.

<Evaluation of Friction Materials> The friction materials obtained in the example and comparative examples were measured for the number of occurrences of squealing and the sound level of that squealing during simulated travel through an urban area (100 cycles of braking at a speed of 40 km/h, deceleration of 0.1 to 1.5 m/s² and temperature of 50 to 150° C.). The results are shown in Table 2.

TABLE 2

|  | Example 1 | Comparative Example 1 | Comparative Example 2 |
| --- | --- | --- | --- |
| Number of occurrences of squealing | 40 | 100 | 80 |
| Squealing sound level | Low to medium | High to medium | High to medium |

According to Table 2, a comparison of Comparative Example 1 and Comparative Example 2 reveals that Comparative Example 2, which included MI, had fewer occurrences of brake squealing than Comparative Example 1, which did not include PAI, and the sound level of that squealing was lower. Moreover, in Example 1, which used a high friction component (zircon) that was preliminarily coated with an amorphous resin in the form of PAI, the number of occurrences of brake squealing was reduced by half and squealing sound level was lower than Comparative Example 2, which included the same components at the same ratios with the exception of the zircon not being preliminarily coated with PAI. Namely, preliminary coating of a high friction component with an amorphous resin was determined to have a considerable effect on inhibiting brake squealing as compared with the case of simply mixing an amorphous resin.

What is claimed is:

1. A production method of a friction material, comprising:
dispersing an amorphous resin selected from the group consisting of a polyimide, a polyamidoimide, a polycarbonate, a polyphenylene ether, a polyarylate, a polysulfone and a polyester sulfone in at least one component selected from the group consisting of a filler component, a binder component and a base component, wherein the dispersing is carried out in the absence of one or more of the components, to form coated particles wherein at least one of the components is coated with the amorphous resin, then
mixing the coated particles with the components to form the friction material,
wherein the friction material comprises 0.001 to 50 vol % of the amorphous resin.

2. The production method of a friction material according to claim 1, wherein at least two of the components are coated with the amorphous resin in the dispersing.

3. The production method of a friction material according to claim 2, wherein at least two of the components are coated with the amorphous resin in a fluid state in the dispersing.

4. The production method of a friction material according to claim 2, wherein at least two of the components are coated with the amorphous resin in a non-fluid state in the dispersing.

5. The production method of a friction material according to claim 2, wherein all of the components that constitute the friction material, other than the amorphous resin, are coated with the amorphous resin in the dispersion treatment.

6. The production method of a friction material according to claim 1, wherein the at least one component is a thermosetting resin, and the amorphous resin and the thermosetting resin are polymerized in the dispersing.

7. The production method of a friction material according to claim 1, wherein the at least one component is filled into pores of a porous body formed from the amorphous resin in the dispersing.

8. The production method of a friction material according to claim 2, wherein the at least one component in which the amorphous resin is dispersed in the dispersing is a high friction component and the high friction component is coated with the amorphous resin in the dispersing.

9. The production method of a friction material according to claim 8, wherein the high friction component has a Mohs hardness of 6 or more.

10. The production method of a friction material according to claim 8, further comprising:
compounding the high friction component coated with the amorphous resin with a fibrous component.

11. The production method of a friction material according to claim 7, further comprising:
forming the friction material from a plurality of porous bodies filled with at the least one component.

12. The production method of a friction material according to claim 11, wherein the porous bodies are sheets, and a plurality of porous body sheets filled with the at least one component are laminated.

13. The production method of a friction material according to claim 11, wherein different components are filled into at least two of the plurality of porous bodies in the dispersing.

14. The production method of a friction material according to claim 1, wherein the at least one component is a thermosetting resin, and a powder of the amorphous resin is dispersion mixed with the thermosetting resin in the dispersing.

15. The production method of a friction material according to claim 14, wherein the thermosetting resin is at least one selected from the group consisting of a phenolic resin, a modified phenol resin, a urea resin, a melamine resin, a benzoguanamine resin, an amino resin, a furan resin, an unsaturated polyester resin, a diallyl phthalate resin, an allyl resin, an alkyd resin, an epoxy resin, a thermosetting polyamidoimide resin, a thermosetting polyimide resin and a silicone resin.

16. The production method of a friction material according to claim 14, wherein the powder of the amorphous resin is a spherical powder that has a mean particle diameter of 1 μm or less.

17. The production method of a friction material according to claim 14, wherein the powder of the amorphous resin has a flat shape.

18. The production method of a friction material according to claim 17, wherein the powder of the amorphous resin has a flat shape that has a thickness of 1 μm or less and a length of one side of a square, whose area is same as a surface area in a planar direction of the powder of the amorphous resin, is 3 μm or less.

\* \* \* \* \*